US008336823B2

(12) United States Patent
Saint-Jalmes et al.

(10) Patent No.: US 8,336,823 B2
(45) Date of Patent: Dec. 25, 2012

(54) AIRCRAFT FUSELAGE

(75) Inventors: Bruno Saint-Jalmes, Toulouse (FR); Jason Zaneboni, Toulouse (FR); Mathieu Belleville, Bazus (FR)

(73) Assignees: Airbus, Blagnac (FR); Airbus Operations SAS, Toulouse (FR)

(*) Notice: Subject to any disclaimer, the term of this patent is extended or adjusted under 35 U.S.C. 154(b) by 328 days.

(21) Appl. No.: 12/520,881

(22) PCT Filed: Dec. 21, 2007

(86) PCT No.: PCT/FR2007/002148

§ 371 (c)(1), (2), (4) Date: Jul. 28, 2009

(87) PCT Pub. No.: WO2008/096073

PCT Pub. Date: Aug. 14, 2008

(65) Prior Publication Data

US 2010/0032518 A1 Feb. 11, 2010

(30) Foreign Application Priority Data

Dec. 26, 2006 (FR) ..................................... 06 11364

(51) Int. Cl.
*B64C 1/00* (2006.01)

(52) U.S. Cl. .................................... 244/119; 244/118.6

(58) Field of Classification Search .................. 244/119, 244/118.6, 118.1, 45 R, 117.1, 13, 118.5, 244/36, 117 R, 129.1, 137.2, 190, 4 R, 5, 244/6, 129.5

See application file for complete search history.

(56) References Cited

U.S. PATENT DOCUMENTS

| | | | | |
|---|---|---|---|---|
| 4,390,150 | A * | 6/1983 | Whitener | 244/45 R |
| 4,674,712 | A * | 6/1987 | Whitener et al. | 244/119 |
| 4,828,204 | A * | 5/1989 | Friebel | 244/15 |
| 4,976,396 | A * | 12/1990 | Carlson et al. | 244/55 |
| 5,088,661 | A * | 2/1992 | Whitener | 244/76 R |
| 6,612,522 | B1 * | 9/2003 | Aldrin et al. | 244/2 |
| 2003/0062449 | A1 * | 4/2003 | Sankrithi | 244/118.6 |
| 2003/0189135 | A1 * | 10/2003 | Konya | 244/137.2 |
| 2003/0213871 | A1 * | 11/2003 | Howe et al. | 244/129.1 |
| 2009/0108140 | A1 * | 4/2009 | Adams et al. | 244/190 |

FOREIGN PATENT DOCUMENTS

| | | |
|---|---|---|
| EP | 1 413 513 | 4/2004 |
| GB | 913 005 | 12/1962 |
| RU | 2095267 C1 * | 11/1997 |
| WO | 02 057135 | 7/2002 |
| WO | 2006 108957 | 10/2006 |

OTHER PUBLICATIONS

"Boeing fights to revive Sonic interest", Flight International, vol. 162, No. 4850, p. 6, XP001125175, (2002).

* cited by examiner

*Primary Examiner* — Christopher P Ellis
*Assistant Examiner* — Medhat Badawi
(74) *Attorney, Agent, or Firm* — Oblon, Spivak, McClelland, Maier & Neustadt, L.L.P.

(57) ABSTRACT

An aircraft fuselage including a front part including a cockpit, a central part, and a rear part. The central part of the fuselage includes a first zone located at the front part and that increases in width to a maximum width towards the rear of the aircraft, a second zone that decreases in width, and a third zone that has an essentially constant width and is located behind the second zone, width begin measured along the pitch axis.

12 Claims, 6 Drawing Sheets

Figure 1:
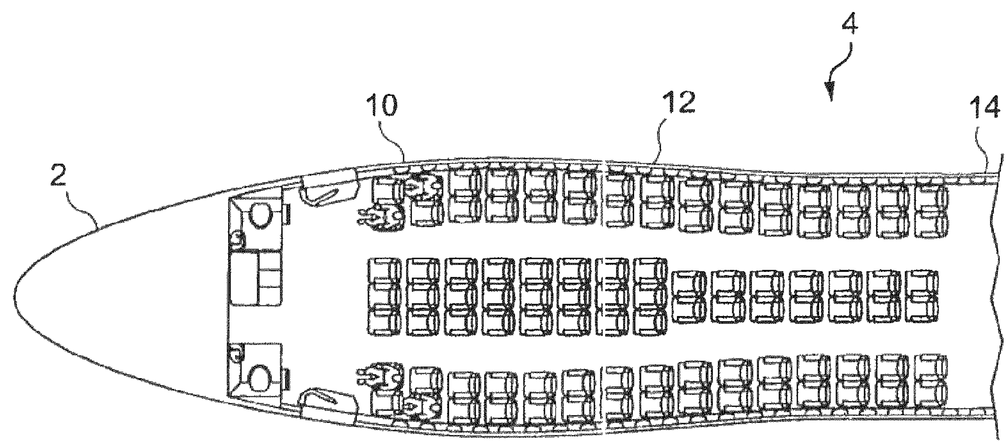

4
10
12
14
2

6
4
z
y
12
10
x
16
22
2

16
2

16

10
12
14
6
2
22
4

4
6
2
22
16

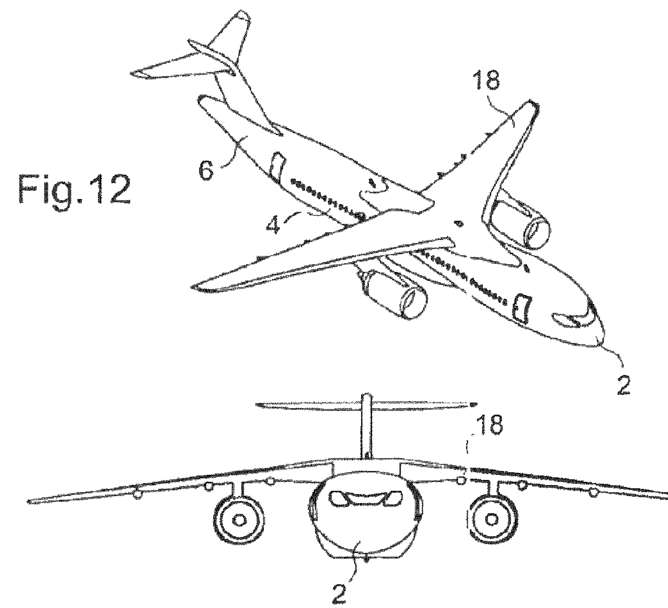
Fig.12
Fig.13
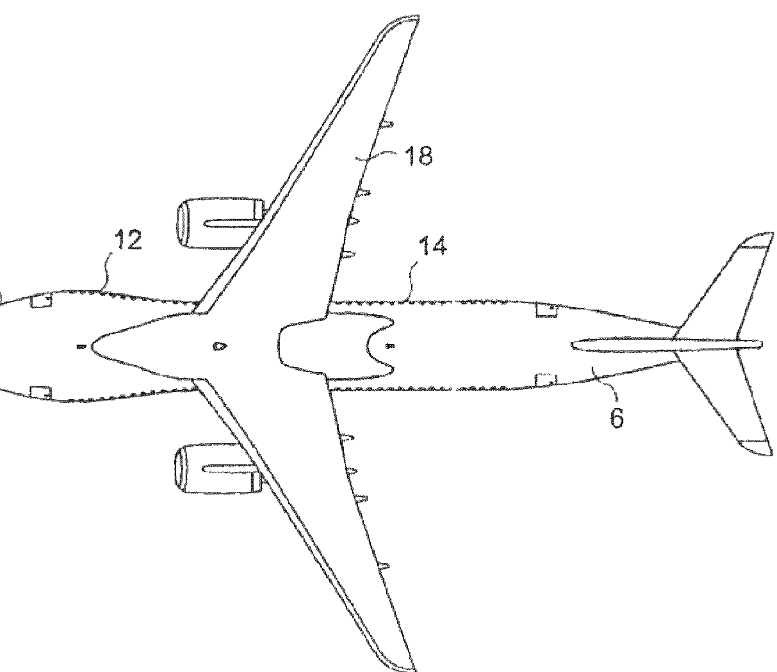
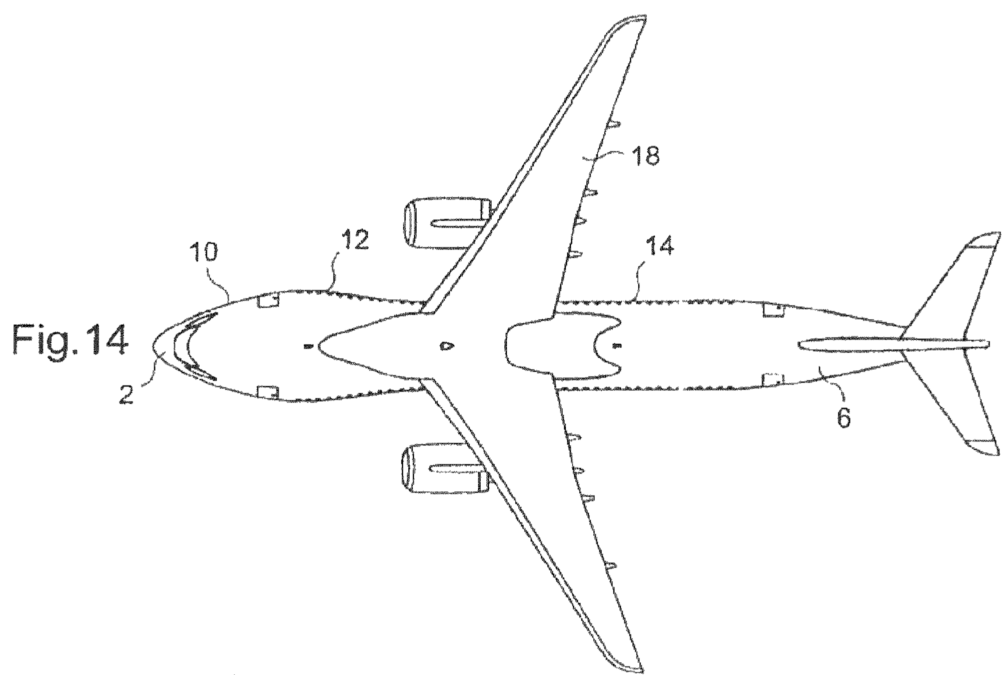
Fig.14
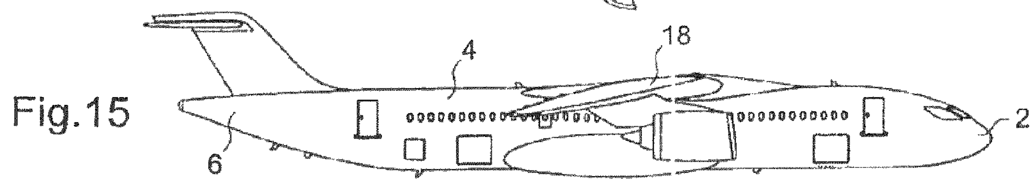
Fig.15

AIRCRAFT FUSELAGE

This invention relates to an aircraft fuselage, in particular for an aircraft intended for the commercial transport of passengers.

In standard manner, an aircraft has a front portion with rounded aerodynamic shape, a central fuselage with overall circular cylindrical shape and a rear portion with the overall shape of a truncated cone accommodating a stabilizer. The front portion houses the cockpit of the aircraft. The central portion is intended in particular to accommodate a passenger cabin and a hold. The airfoil of the aircraft is attached to this central portion of the fuselage of the aircraft. The engines of the aircraft generally are integral with the airfoil or else are mounted on the rear portion of the aircraft.

In order to optimize the interior space of an aircraft, it already is known to modify the section of the central portion of the fuselage. Thus, for example, the document EP-1 413 513 proposes an aircraft fuselage comprising a first portion having a first dimension along the nose axis of the aircraft and a third fuselage portion having a third dimension along the nose axis of the aircraft. The second dimension of the fuselage along the nose axis of the aircraft is less than the first dimension corresponding to the first portion of the fuselage and the third dimension along the nose axis corresponding to the third fuselage portion. Such an aircraft makes it possible in particular to have a profile in accordance with the law of areas.

This invention has as its purpose to provide an aircraft fuselage that makes it possible to save space inside the aircraft while having advantageous aerodynamic features. The fuselage preferably will have a section favorable for withstanding the stresses due to pressurization inside the aircraft. The fuselage preferably also will allow an optimization in terms of interior layout, centering of masses and aerodynamics.

To this end, this invention then proposes an aircraft fuselage comprising a front portion with a cockpit, a central portion and a rear portion.

According to the invention, the central portion of the fuselage has on the front-portion side a first zone the width of which, measured along the pitch axis, is increasing up to a maximum width from the front to the rear of the aircraft, a second zone the width of which is decreasing and a third zone behind the second zone the width of which is more or less constant.

The widening achieved at the front of the central fuselage of the aircraft is advantageous because it makes it possible, first of all, to increase the space available for positioning seats in the aircraft. This widened shape of the fuselage at the front is aerodynamically favorable because it makes it possible to increase the lift of the aircraft.

According to a first embodiment of a fuselage according to this invention, the second zone of the central portion of the fuselage is connected directly to the first zone of the central portion of the fuselage. It also can be provided, however, that in order to accommodate a greater number of passengers in the cabin of the aircraft, the second zone of the central portion of the fuselage is separated from the first zone of the central fuselage portion by a fuselage portion the width of which corresponds more or less to the maximum width of the fuselage.

In order to allow a more rapid boarding and deplaning of the passengers, it is proposed that the fuselage has a first door intended for the boarding of the passengers at the rear of the second zone of the central fuselage or at the front of the third zone of the central fuselage. Of course, a second door arranged symmetrically in relation to the vertical longitudinal axial plane of the fuselage also is provided and the first door mentioned above is in reality a pair of doors.

The airfoil is attached to the fuselage preferably at the third zone of the central fuselage for aerodynamic reasons.

In order to favor on the one hand the space that can be used for the passengers in the fuselage and on the other hand to increase the lift of this fuselage, the transverse section of the central fuselage advantageously has a flattened-out rounded shape having a width measured along the pitch axis greater than the height measured along the nose axis. A preferred embodiment variant provides that the transverse section of the central fuselage has the shape of two arcs of a circle with a large radius arranged facing one another and corresponding to the upper portion and the lower portion of the central fuselage and connected to one another, with a transition zone, by two arcs of a circle with a lesser radius and corresponding to the side walls of the central fuselage. This shape makes it possible to have a resistance structure without, for all that, having to provide excessive reinforcements of the structure or make the latter excessively heavy.

The height of the central portion of the fuselage, measured along the nose axis, preferably is more or less constant so as to facilitate the production of this fuselage and its interior layout.

For a better centering of the masses of an aircraft with a fuselage according to the invention, the engines advantageously are arranged at the rear and are attached to the rear portion of the fuselage. This also makes it possible to have a quieter cabin in flight.

For the transport of goods, the rear portion of the fuselage is, for example, laid out as a hold that can accommodate LD3-type containers.

This invention also relates to an aircraft, characterized in that it comprises a fuselage such as described above.

Figure 2:
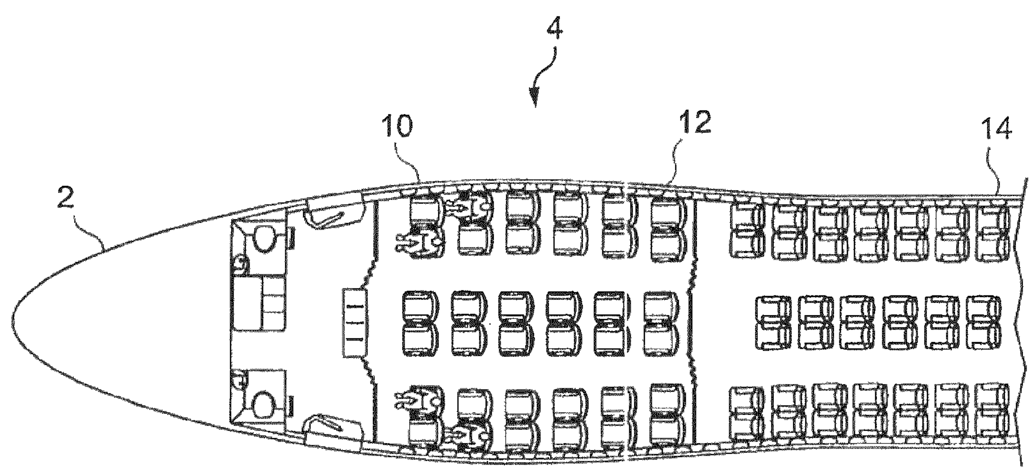
Figure 3:
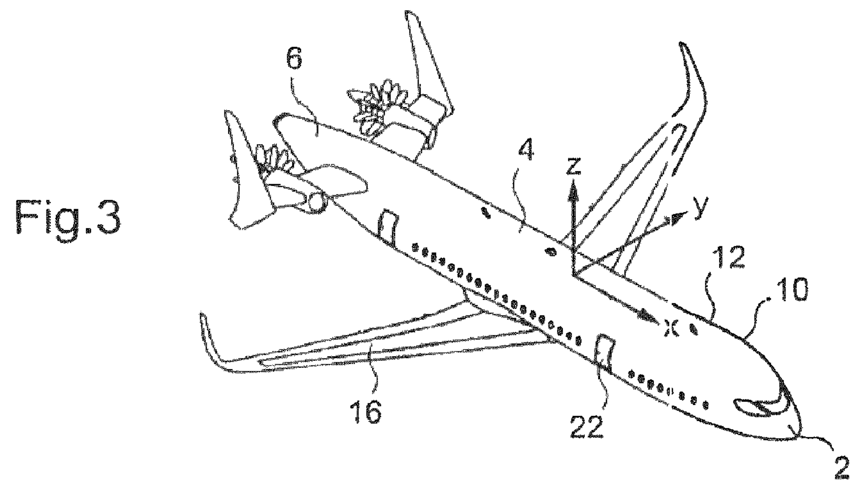
Figure 4:
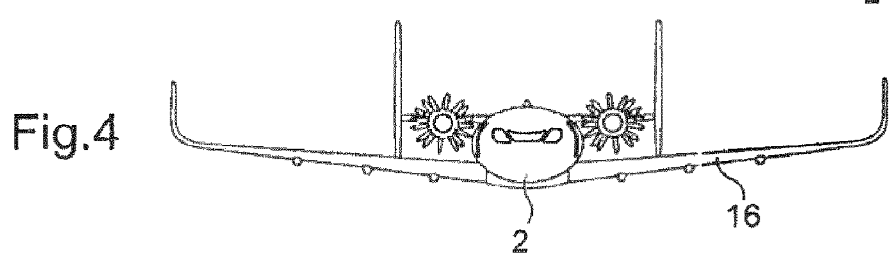
Figure 5:
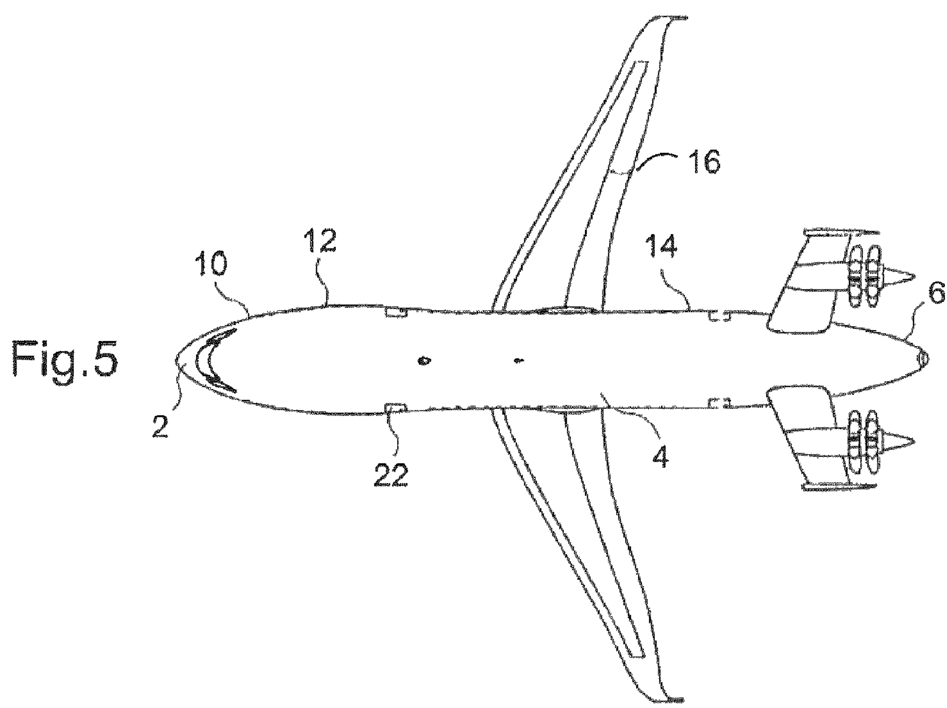
Figure 6:
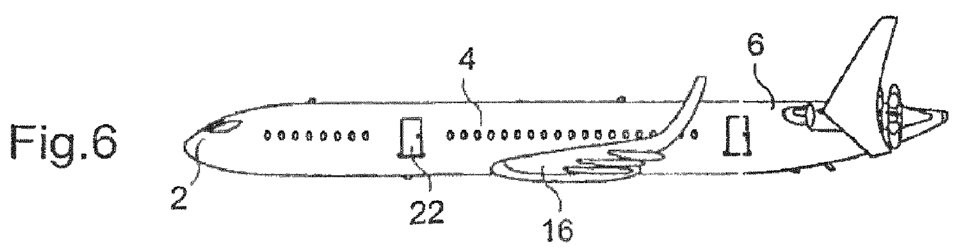
Figure 7:
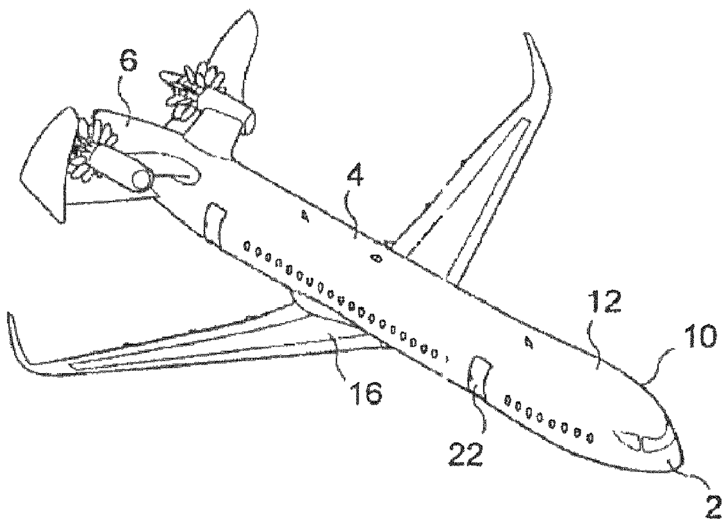
Figure 8:
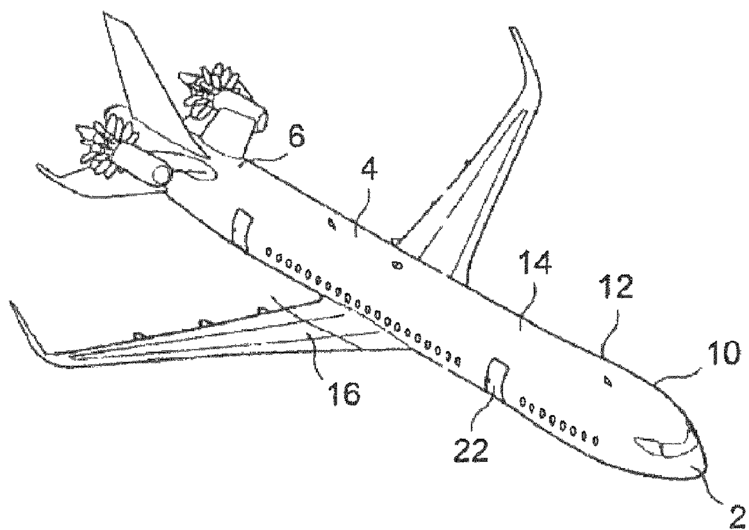
Figure 9:
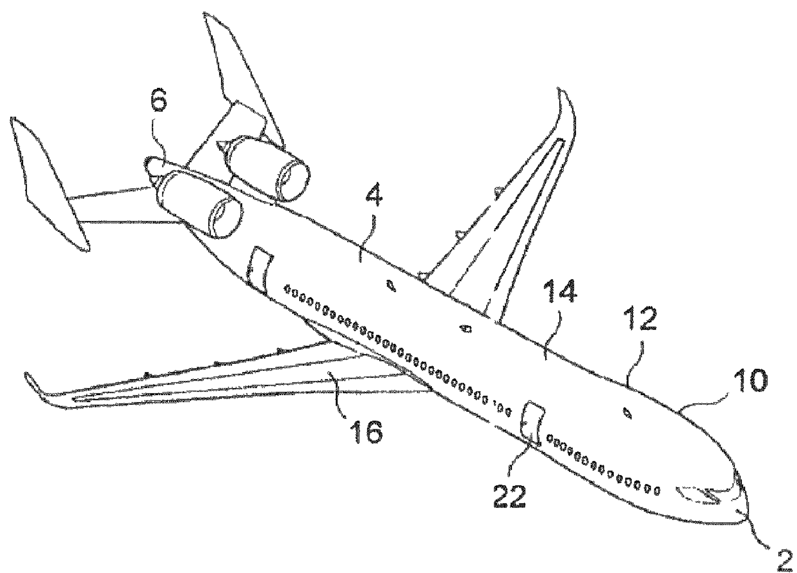
Figure 10:
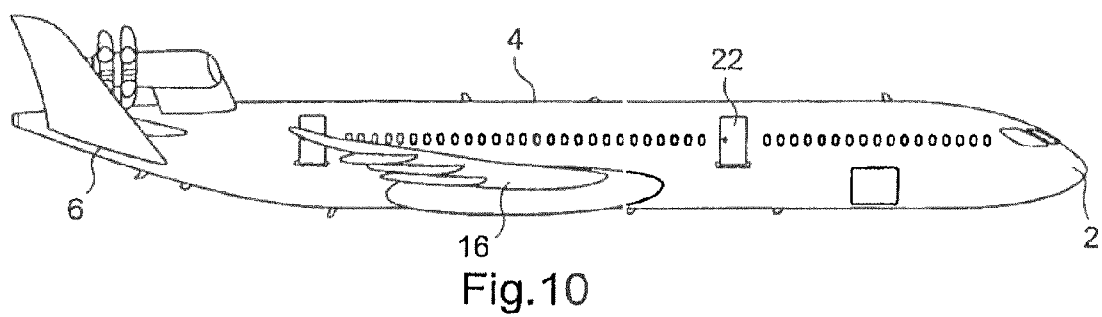
Figure 11:
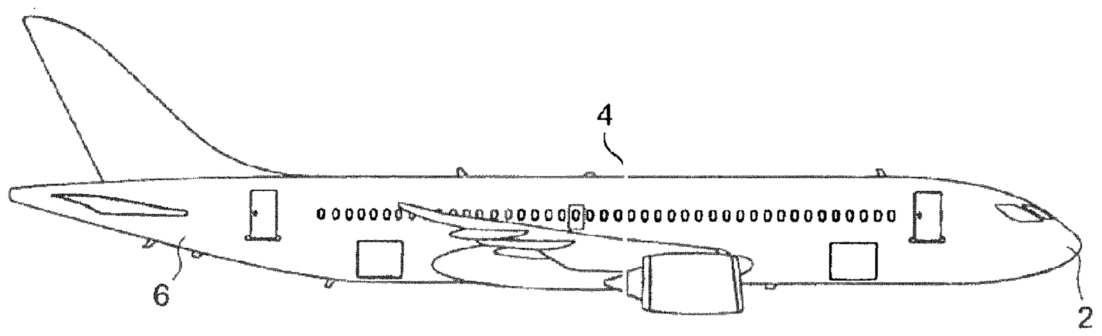
Figure 16:
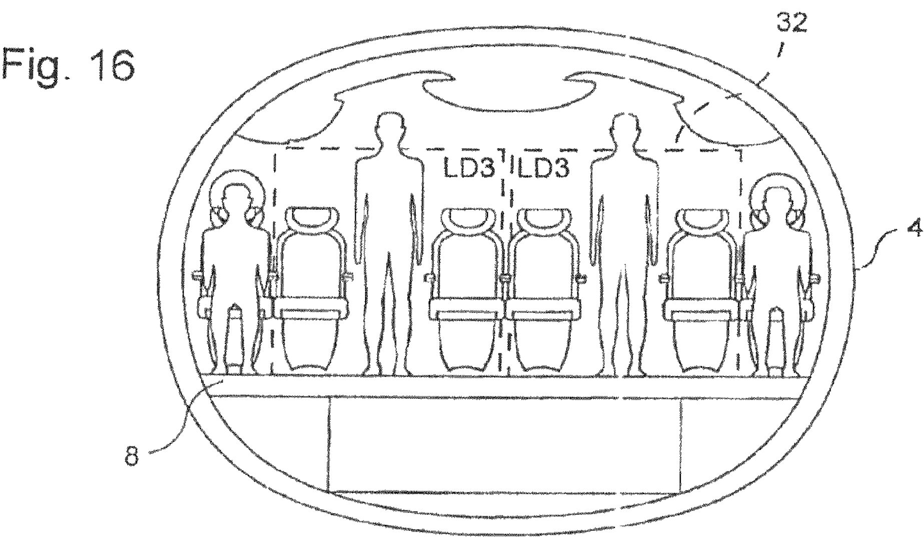
Figure 17:
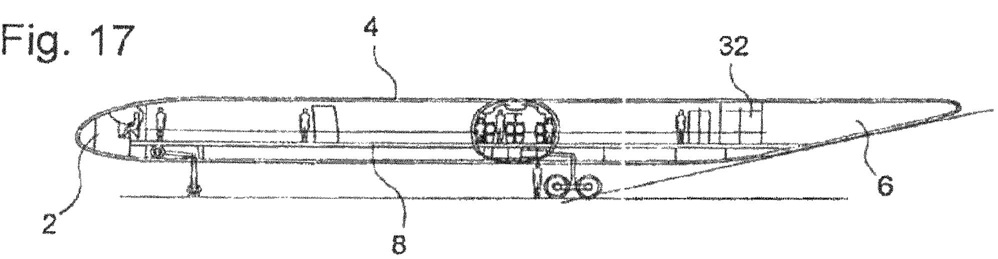
Figure 18:
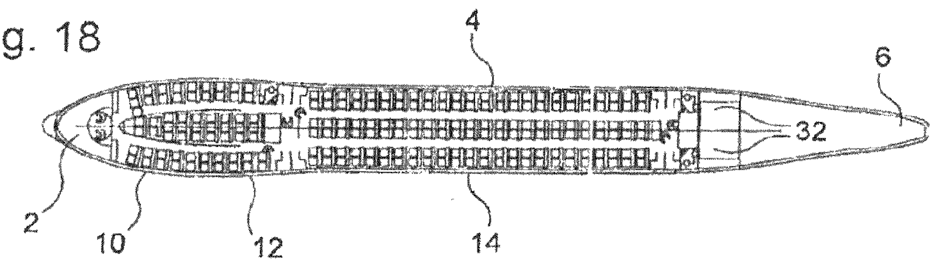
Figure 19:
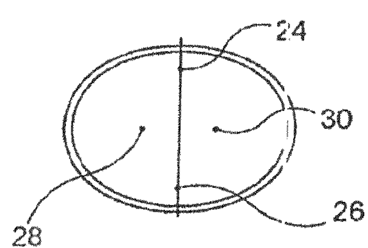

Details and advantages of this invention will become more apparent from the description that follows, presented in reference to the attached schematic drawings, on which:

FIG. 1 is a plan view of the front portion of a passenger cabin of an aircraft with a fuselage according to the invention, FIG. 2 is a view corresponding to FIG. 1 for a different interior layout of the passenger cabin, FIG. 3 is a perspective view of an aircraft according to the invention, FIGS. 4 to 6 are views from the front, from above and from the side, respectively, of the aircraft of FIG. 3, FIGS. 7 to 9 are perspective views of embodiment variants of an aircraft according to the invention in which the engines are borne by the rear portion of the fuselage of the aircraft;

FIG. 10 is a side view of the aircraft of FIG. 7,

FIG. 11 is a side view of a “standard” configuration of an aircraft according to the invention, FIG. 12 is a perspective view of an aircraft according to the invention having an airfoil in upper position, FIGS. 13 to 15 are views from the front, from above and from the side, respectively, of the aircraft of FIG. 12, FIG. 16 is a schematic view in longitudinal section of an aircraft according to the invention, FIG. 17 is a view in horizontal section showing the interior configuration of the aircraft of FIG. 16, FIG. 18 is a view in cross section, on an enlarged scale, through the cabin of a preferred variant of an aircraft according to the invention, and FIG. 19 shows in cross section the outer shape of the fuselage of a preferred embodiment corresponding, for example, to FIGS. 16 to 18.

The drawings each relate to an aircraft that has a fuselage associated with an airfoil and engines.

Throughout the description that follows, the terms “front,” “rear” refer to the aircraft and to its direction of movement in flight. The notions of lower and upper relative positions are indicated, for example, when the aircraft is cruising or when it is set down on the ground.

In standard manner, the fuselage comprises three portions: a front portion 2, a central portion 4 and a rear portion 6.

In front portion 2 of the fuselage, there is a cockpit forming a piloting station for the aircraft. This piloting station comprises in particular all the control components for the piloting of the aircraft, monitor screens, means of communication on the one hand internal to the aircraft and on the other hand external for communicating with a control tower or else even other aircraft, seats for the pilots, etc.

Central portion 4 of the fuselage is immediately behind front portion 2. This portion of the fuselage is intended in particular to accommodate passengers, their baggage and possibly goods. To this end, central portion 4 of the fuselage comprises in particular a cabin laid out on the floor of cabin 8 forming a bridge (FIGS. 16 and 18).

Rear portion 6 of the fuselage has, in particular for aerodynamic reasons, a shape suggesting a cone. In standard manner it accommodates a stabilizer that varies according to the embodiments of the aircraft according to the invention.

This invention relates primarily to central portion 4 of the fuselage. The latter comprises three zones: a first zone 10 at the front of central portion 4, a second zone 12 arranged at the rear of first zone 10 and finally a third zone 14 at the rear of central portion 4 of the fuselage.

On FIG. 3 of the drawings, there has been shown, for an aircraft according to the invention, its roll axis (x axis), its pitch axis (y axis) and its nose axis (z axis).

All along central portion 4, in a preferred embodiment of the invention, the height thereof (measured along the nose axis) is constant (or at least more or less constant), as is apparent in particular from the side views of the embodiment variants of an aircraft according to the invention. The context of the invention would not be exceeded, however, if the height of central portion 4 of the fuselage varied along its longitudinal axis (roll axis).

The first zone 10 of central portion 4 of the fuselage has a width (measured along the pitch axis) increasing along the roll axis, from the front to the rear of the aircraft. In this first zone 10, the width of the fuselage of the aircraft increases up to a maximum value.

In second zone 12 of central portion 4, the width of the fuselage of the aircraft decreases, starting from the maximum value of this width up to a value that corresponds to the width of third zone 14 that is more or less constant.

Second zone 12 can be, for example, more or less symmetrical to first zone 10 in relation to the cross-section plane of central portion 4 of greater width.

In an embodiment variant not shown on the drawings, an intermediate zone can be introduced between first zone 10 and second zone 12. This intermediate zone, with a constant width equal to the maximum width of central portion 4 of the fuselage, is provided, for example, in order to produce an extended aircraft variant intended for a greater number of passengers.

FIGS. 1 and 2 in particular illustrate two embodiments of an interior layout of first zone 10 and of second zone 12 of an aircraft according to the invention.

It is noted that by virtue of the increased width, an attractive interior space can be used in the cabin of the aircraft. In the embodiment variant of FIG. 1, the cabin of the aircraft is laid out with a single comfort class, for example an economy class. Whereas in third zone 14 and at the rear of second zone 12, the configuration of the cabin provides for arranging six seats abreast, in the zone of greatest width of first zone 10 and of second zone 12, seven seats can be arranged abreast. This enlarged shape thus makes it possible, in the example of FIG. 1, to “gain” eight seats. For an airline company, such a gain is very appreciable.

In the embodiment variant of FIG. 2, the aircraft cabin is laid out according to two comfort classes, for example an economy class (at the rear) and a business class (at the front). The business class is arranged in central portion 4 of the fuselage with greatest width. It then is possible to have as many seats (six) in the business class compartment as in the economy class compartment. This is entirely original in an aircraft. Indeed, in all the known layouts of aircraft cabins for civil transport of passengers, providing two (or three) comfort classes, the number of seats arranged in the width of the aircraft decreases when the comfort increases. For an airline company, the gain in income with an aircraft according to the invention is obvious. In the variant of FIG. 2, the gain in relation to an aircraft having a fuselage central portion of constant width is at least six business class seats.

The airfoil of the aircraft is attached to central portion 4 of the fuselage at third zone 14. It can be a matter of an airfoil 16 in lower position as shown, for example, in the embodiments of FIGS. 3 to 11 or else an airfoil 18 in upper position as shown, for example, on FIGS. 12 to 15.

Preferably, the wings of the airfoil are attached to third zone 16 of central portion 4, at a distance from second zone 12. There thus is a fuselage portion 20 of constant width between second zone 12 and the wings. This “straight” portion 20 can be used advantageously to accommodate a door 22. It can be a matter of the boarding door of the aircraft. This door 22 then is not at the front of the cabin intended to accommodate the passengers. In this way, when passengers are boarding the aircraft through door 22, depending on the seat that has been assigned to them, the passengers will turn left or right in the cabin. This makes it possible to appreciably increase the speed of boarding of passengers in the aircraft.

This boarding door 22 also may be at second zone 12 or at the joining between second zone 12 and third zone 14. A “standard” boarding also may be considered and is suggested, for example, on FIGS. 1, 2, 11 and 12 to 15.

In the case of an extended fuselage, in which, as mentioned above, an intermediate zone is arranged between first zone 10 and second zone 12, boarding also may be provided from this intermediate zone.

This invention is particularly well suited for aircraft comprising engines at the rear. These engines then are borne by rear fuselage 6 of the aircraft. Indeed, as a result of the increased width of the fuselage at first zone 10 and second zone 12, an “imbalance” toward the front of the aircraft is created. The fact of arranging engines at the rear of the aircraft makes it possible to restore balance. This distribution of the masses is even advantageous for the aircraft in comparison with a standard distribution that also can be adopted on an aircraft according to the invention as illustrated in FIGS. 10 to 15. In these embodiments, the engines are arranged beneath the airfoil.

The position of the engines, apart from the balancing concerning masses of the aircraft, also has the advantage of being more comfortable for the passengers. The cabin of the aircraft then is quieter than with engines in central position, especially for the passengers being seated to the rear of the engines.

These engines can be jet engines (FIGS. 11 to 15) but a variant of the aircraft with turbo-powered propeller engines, known under the English name “propfan,” makes it possible to limit the fuel consumption of the aircraft with performances scarcely lower than those obtained with jet engines (FIGS. 3 to 8 and 10).

In an embodiment variant of the drawings, the engines are attached to the stabilizer of the aircraft (FIGS. 3-6). In the embodiments of FIGS. 7 to 10, the engines are attached directly onto rear portion 6 of the fuselage. As for the embodiments of FIGS. 7 to 11, they provide a standard arrangement of the engines, attached underneath the airfoil.

FIGS. 16 to 19 illustrate a preferred embodiment of a cross section of central part 4 of the fuselage of an aircraft according to the invention. In comparison with the standard circular shape of an aircraft fuselage transverse section, the shape of the section proposed here is flattened out on the top and the bottom so as to have a width greater than the height. This shape makes it possible, inside the aircraft, to favor the space inside the cabin intended to accommodate the passengers. Outside the aircraft, this shape is advantageous because it is more favorable on the aerodynamic level than a circular section cylindrical shape.

So that the structure will be resistant without having an overly great number of reinforcements which weigh down the aircraft and limit the usable space in the interior thereof, the outer shape of the transverse section of the fuselage of the aircraft at its central portion which is proposed here is a succession of arcs of a circle connected to each other.

On FIG. 19 there have been shown four bending centers corresponding to four arcs of a circle defining the shape of a transverse section of the central portion of the fuselage of the aircraft. The upper center 24 shown on this FIG. 19 is the center of the arc of a circle corresponding to the lower face of central portion 4. This lower face has a bending radius R. On this Figure, as regards lower center 26, it corresponds to the center of the arc of a circle corresponding to the upper face of central portion 4 of the aircraft. This arc of a circle itself also has the same bending radius R.

Still on FIG. 19, the center 28 shown on the left is the bending center of the arc of a circle corresponding to the left side wall of central portion 4 of the aircraft. This arc of a circle has a bending radius r, r being less than R. By symmetry of central portion 4 of the fuselage of the aircraft, the fourth center 30 shown on the right on FIG. 19 corresponds to the bending center of the right side wall of the fuselage of the aircraft and the corresponding arc of a circle has the same bending radius r.

As is noted in particular on FIGS. 16 and 17, the flattened-out shape of central portion 4 of the fuselage such as described above favors the space available in the cabin intended to accommodate the passengers to the detriment of the room available in the hold. The space available in the hold is entirely sufficient for storing the baggage of the passengers traveling in the cabin of the aircraft. It is preferable, however, also to be able to transport standard containers 32.

The embodiment of FIGS. 16 to 18 proposes to provide at the rear of central portion 4, or else at the joining between central portion 4 with rear portion 6 of the fuselage, or else even at the front of rear portion 6, a storage space sufficient for accommodating, for example, two LD3-type containers 32. The aircraft then also can carry along some goods in addition to the passengers traveling in the aircraft. This, of course, is advantageous for the commercial operation of the aircraft.

The aircraft fuselage presented above thus introduces numerous advantages in relation to a standard aircraft fuselage. On the inside, the proposed fuselage makes it possible to save space first by virtue of the special shape of the front of the central portion of the fuselage and then also by virtue of the shape imparted to the transverse section of this central portion. This shape moreover makes it possible to improve the aerodynamic performances of the aircraft.

An aircraft fuselage according to this invention also allows a good centering of the masses of the aircraft. In the preferred embodiment with engines at the rear, the balance of the masses in the aircraft is entirely favorable. This position of the engines at the rear also makes it possible to enhance the comfort of the passengers, because the noise of the engines is less perceptible in the cabin of the aircraft.

The proposed fuselage also is optimized for allowing a rapid boarding and deplaning of the passengers.

Finally, as is apparent from the examples of various embodiments considered and shown in the drawings, a fuselage according to the invention can make it possible to produce airplanes with very diverse variants such as, for example, as regards the positioning of the airfoil and the engines. It should be noted here that the examples given and the variants shown in the drawings are not exhaustive. As also mentioned, the fuselage can be extended, preferably between first zone 10 of central portion 4 of the fuselage and second zone 12 of this central portion in order to accommodate more passengers.

This invention is not limited to the embodiments described and shown by way of non-limiting examples. On the contrary, it relates to all the embodiments within the capacity of the individual skilled in the art in the context of the claims below.

The invention claimed is:

1. A passenger aircraft fuselage comprising:

a front portion including a cockpit;

a central portion; and a rear portion, wherein the central portion of the fuselage includes on a side of the front portion a first zone the width of which, measured along the pitch axis, is increasing up to a maximum width from the front toward the rear of the aircraft, a second zone the width of which is decreasing, and a third zone behind the second zone and the width of which is more or less constant, the central portion having a height that is substantially constant throughout the first, second, and third zones.

2. The passenger aircraft fuselage according to claim 1, wherein the second zone of the central portion of the fuselage is connected directly to the first zone of the central portion of the fuselage.

3. The passenger aircraft fuselage according to claim 1, wherein the second zone of the central portion of the fuselage is separated from the first zone of the central fuselage portion by a fuselage portion the width of which corresponds more or less to the maximum width of the fuselage.

4. The passenger aircraft fuselage according to claim 1, wherein the fuselage further comprises a first door configured for boarding of a passenger at the rear of the second zone of the central portion of the fuselage or at the front of the third zone of the central portion of the fuselage.

5. The passenger aircraft fuselage according to claim 1, further comprising an airfoil attached to the fuselage at the third zone of the central portion of the fuselage.

6. The passenger aircraft fuselage according to claim 1, wherein a transverse section of the central portion of the fuselage has a flattened-out rounded shape having a width measured along the pitch axis greater than the height measured along the nose axis.

7. The passenger aircraft fuselage according to claim 6, wherein the transverse section of the central portion of the fuselage has the shape of two arcs of a circle with large radius arranged facing one another and corresponding to the upper portion and to the lower portion of the central fuselage and connected to one another, with a transition zone, by two arcs of a circle with lesser radius and corresponding to side walls of the central portion of the fuselage.

8. The passenger aircraft fuselage according to claim 1, further comprising engines arranged at the rear and attached to the rear portion of the fuselage.

9. A passenger aircraft, comprising a passenger aircraft fuselage according to claim 1.

10. The passenger aircraft fuselage according to claim 1, wherein the first, second, and third zones of the central portion of the fuselage each include passenger seats, and a number of seats per row in the first zone is greater than a number of seats per row of the third zone.

11. The passenger aircraft fuselage according to claim 1, wherein the first, second, and third zones of the central portion of the fuselage each include passenger seats, and a width of the seats in the first zone is greater than a width of the seats in the third zone.

12. A passenger aircraft fuselage comprising:

a front portion including a cockpit;

a central portion; and a rear portion, wherein the central portion of the fuselage includes on a side of the front portion a first zone the width of which, measured along the pitch axis, is increasing up to a maximum width from the front toward the rear of the aircraft, a second zone the width of which is decreasing, and a third zone behind the second zone and the width of which is more or less constant, the central portion having a height that is substantially constant throughout the first, second, and third zones, and the first, second, and third zones of the central portion of the fuselage each include passenger seats, and a width of the seats in the second zone is greater than a width of the seats in the third zone.

* * * * *